April 22, 1969     E. L. WEIMER     3,439,443
FISHING LURE HAVING TWO MAGNETICALLY INFLUENCED SPINNERS
Filed Sept. 11, 1967
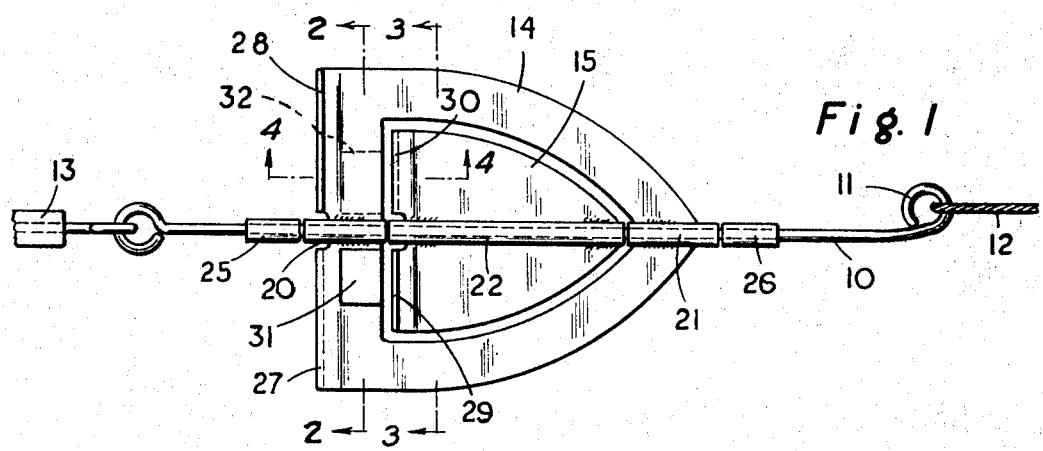
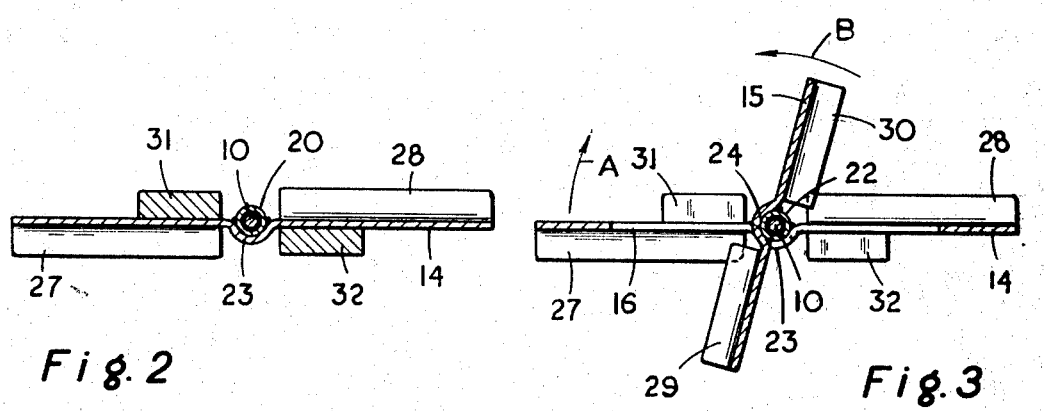
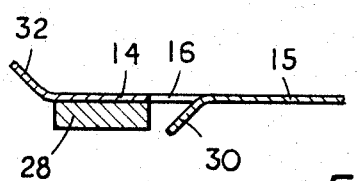
INVENTOR.
EMORY L. WEIMER
BY
*Fred C. Matheny*
ATTORNEY United States Patent Office 3,439,443
Patented Apr. 22, 1969

3,439,443
FISHING LURE HAVING TWO MAGNETICALLY
INFLUENCED SPINNERS
Emory L. Weimer, Orondo, Wash. 98843
Filed Sept. 11, 1967, Ser. No. 666,641
Int. Cl. A01 85/04; A01k 85/00
U.S. Cl. 43—42.12                5 Claims

ABSTRACT OF THE DISCLOSURE

Composed of two flat spinner members, one larger than the other, both mounted on the same rod and both having vanes which make them spin in opposite directions in the water. The smaller spinner member spins within an opening in the larger spinner member and one of the spinner members has permanently magnetized parts which attract the other spinner member and make the spinning movement of the spinners non-uniform and unsteady.

This invention relates to a fishing lure having two magnetically influenced spinners and is in the nature of an improvement on the lure disclosed in my copending application Ser. No. 447,407, filed Apr. 12, 1965, and now Patent No. 3,340,643, issued Sept. 12, 1967.

In connection with fishing lures it is generally recognized that an unsteady or irregular movement of a part of the lure is more liable to be alluring to fish than is a steady or uniform movement of that same part.

It is an object of my invention to provide an improved spinner type lure having spinners which are movable by reaction of the water against them and having permanent magnet means arranged to render the water induced movement of said spinners irregular and unsteady.

Other objects are to provide a double spinner type lure comprising a spinner supporting rod, two spinner members of larger and smaller size respectively, formed of thin flat material and rotatively mounted on said rod, the larger spinner member having a relatively large symmetrically positioned opening in it and the smaller member being rotatively disposed within said opening, the respective spinner members having vanes arranged to be operated by water pressure to rotate the spinner members in opposite directions and at least one of said spinner members having a permanently magnetized part which is adapted to render the spinning movement of both of said spinner members irregular and unsteady.

Other objects of this invention will be apparent from the following description and accompanying drawings.

In the drawings FIGURE 1 is a plan view of a spinner type lure embodying this invention.

FIG. 2 is an enlarged view, partly in section and partly in elevation, taken on broken line 2–2 of FIG. 1.

FIG. 3 is an enlarged view, partly in section and partly in elevation, taken on broken line 3–3 of FIG. 1, a smaller spinner member being shown in a different position than it is in FIG. 1.

FIG. 4 is an enlarged fragmentary view, partly in section and partly in elevation taken on broken line 4–4 of FIG. 1.

Like reference numerals refer to like parts throughout the several views.

This lure comprises a straight spinner supporting rod or bar 10 having a forward end provided with means 11 for connection with a line 12 and a rear end provided with means, such as a swivel 13, with which one or more hooks, not shown, can be connected. A larger spinner member 14 and a smaller spinner member 15 are rotatively mounted on the rod 10. Each spinner member 14 and 15 is of generally triangular shape and the larger spinner member 14 has a relatively large symmetrical opening 16 within which the smaller spinner member 15 is rotatively disposed. Each spinner member 14 and 15 has a forwardly directed apex portion and a base opposite the apex portion and two similar sides extending between the apex portion and the extremities of the base and each is symmetrically positioned relative to the rod 10 with the rod extending across the apex and base.

The spinner members 14 and 15 are preferably formed of thin metal or plastic and obviously the smaller spinner member 15 can be made from the piece of material removed from the larger spinner member 14 in forming the opening 16. The surface finish of the two sides of each spinner member 14 and 15 can be of different color or one or both sides of each spinner member may be highly light reflective.

One satisfactory way to roatively mount the spinner members 14 and 15 on the rod 10 is to secure to the base part and the apex part of the larger spinner member 14 two axially aligned bearing tubes 20 and 21 respectively with the bearing tube 20 positioned mid way between the two sides of said spinner member 14 and to secure to the smaller spinner member 15 at least one medially positioned bearing tube 22. These tubes receive and fit rotatively on the rod 10. Perferably a semi-cylindrical groove 23 is provided in the base part of the larger spinner member 14, as shown in FIG. 2, to receive tube 20 and a similar groove, not shown is provided to receive tube 21. Also a groove 24 is provided in the smaller spinner member 15 to receive tube 23, as shown in FIG. 3. Placing the bearing tubes in semi-cylindrical grooves in members 14 and 15 positions the axis of these tubes in the plane of the spinner members and improves appearance. Preferably two short pieces 25 and 26 of tubing are rigidly secured to the rod 10 adjacent the base and apex respectively of the larger spinner member 14 to serve as positioning devices and end thrust members.

Two vanes 27 and 28 are provided on the rear edge portion of the larger spinner member 14 at opposite sides of the rod 10. These vanes 27 and 28 are inclined in opposite directions from the plane of the spinner member 14 and water reaction against their forward surfaces will spin the member 14 in the direction indicated by the arrow A in FIG. 3. Also two vanes 29 and 30 which are oppositely inclined relative to each other and oppositely inclined to the vanes 27 and 28 on the larger spinner member 14 are provided on the rear edge of the smaller spinner member 15 to impart to it spinning movement in the opposite direction from spinner member 14 as indicated by arrow B in FIG. 3. Obviously the position, shape and number of the vanes 27 to 30 can be varied.

At least one permanently magnetized part is provided in connection with at least one of the spinner members 14 or 15 and is arranged so it will render the spinning movement of these members 14 and 15 somewhat irregular and unsteady. In the disclosure herein this result is attained by securing to the base part of the spinner member 14 at opposite sides of the rod 10 and on opposite faces of said member 14, two permanent magnets 31 and 32 and by making the smaller spinner member 15 out of material, such as sheet iron, which is attracted by magnetic force. When the two magnets 31 and 32 are positioned on opposite faces of the spinner member 14 both will exert a maximum force on the other spinner member 15 at the same instant and a maximum variation in the uniformity of rotary movement will be obtained.

Obviously one or more magnets can be used and they can be attached to either spinner member provided the other spinner member is made of or carries suitably positioned magnetically attractable material. Also one or more magnets of the same or opposite polarity can be carried by each spinner member or instead of attaching magnets to the spinner members parts one or both of said spinner members can be magnetized.

When this lure is drawn through the water or is suspended in flowing water the reaction of the water on the vanes 27 and 30 will cause the spinner members 14 and 15 to spin in opposite directions. As the rear edge portions of the spinner member 15 approach the magnets on the spinner member 14 the magnetic force will tend to increase the speed of both spinner members and as these parts pass and move away from each other this same magnetic force will tend to retard their speed. This results in a non-uniform spinning movement of the members 14 and 15 which has been found to be more alluring to fish than is a uniform spinning movement of these same members.

The foregoing description and accompanying drawings clearly disclose a preferred embodiment of my invention but it will be understood that this disclosure is merely illustrative.

I claim:

1. A spinner type fishing lure comprising a spinner supporting rod having a forward end portion provided with line attachment means; two spinner members of thin flat material and of larger and smaller size respectively rotatively mounted on said rod, the larger spinner member having in it a relatively large opening and the smaller spinner member being rotatively disposed within said opening; and oppositely curved vanes on the respective spinner members operable by water reaction thereon in imparting rotation in opposite directions to said two spinner members, at least one of said spinner members having a permanently magnetized part positioned to exert magnetic force on the other spinner member and render irregular water induced spinning movement of said spinner members.

2. The lure as claimed in claim 1 in which both spinner members are of generally triangular shape and are symmetrically positioned on the rod with the rod extending across their apex and base portions and their apex portions positioned nearest to the end of the rod which is provided with the line attachment means.

3. The lure as claimed in claim 1 in which the smaller spinner member is of magnetically attractable material and the permanently magnetized part is a part of the larger spinner member.

4. The lure as claimed in claim 1 in which both spinner members are of generally triangular shape and each has an apex portion and a base opposite the apex portion and two similar sides extending from the apex to the extremities of the base, and in which both spinner members are symmetrically positioned relative to the rod with the rod extending across the apex and base, and in which the oppositely curved vanes of both spinner members are positioned on the base portions of said members.

5. The lure as claimed in claim 4 in which the smaller spinner member is formed of magnetically attractable material and the permanently magnetized part of the lure is in the form of two permanent magnets secured in balanced relation to opposite sides of the base portion of the larger spinner member.

References Cited

UNITED STATES PATENTS

| | | | |
|---|---|---|---|
| 576,680 | 2/1897 | Kittle | 43—42.12 |
| 2,002,117 | 5/1935 | Lavitt | 43—42.12 |
| 3,196,574 | 7/1965 | Weimer | 43—42.03 |
| 3,279,117 | 10/1966 | Weimer | 43—42.03 |

WARNER H. CAMP, *Primary Examiner.*

U.S. Cl. X.R.

43—42.14, 42.2